(12) United States Patent
Baumann

(10) Patent No.: US 6,296,359 B1
(45) Date of Patent: Oct. 2, 2001

(54) CINEMATIC FILM PROJECTOR

(75) Inventor: Hans Baumann, Raisdorf (DE)

(73) Assignee: Ernemann CineTec GmbH (DE)

( * ) Notice: Subject to any disclaimer, the term of this patent is extended or adjusted under 35 U.S.C. 154(b) by 0 days.

(21) Appl. No.: 09/398,929

(22) Filed: Sep. 17, 1999

(30) Foreign Application Priority Data

Feb. 20, 1999 (EP) .................................. 99103339

(51) Int. Cl.[7] .............. G03B 9/08; G03B 9/10; G03B 21/14
(52) U.S. Cl. .......... 352/204; 352/208; 352/219; 353/88
(58) Field of Search ................... 352/204–220; 353/88–93; 396/495, 493; 355/71

(56) References Cited

U.S. PATENT DOCUMENTS

| | | | |
|---|---|---|---|
| 1,883,753 | * 10/1932 | Basson | 352/211 |
| 1,884,608 | * 10/1932 | Dina | 352/154 |
| 3,791,734 | * 2/1974 | Mey | 355/67 |
| 4,350,428 | * 9/1982 | Phillips | 396/495 |
| 5,539,488 | * 7/1996 | Erickson et al. | 396/493 |

* cited by examiner

Primary Examiner—Russell Adams
Assistant Examiner—Rodney Fuller
(74) Attorney, Agent, or Firm—Shlesinger, Fitzsimmons & Shlesinger

(57) ABSTRACT

In a cinematic film projector a light source projects light through a single, non-centric light transparent transmission window formed in a rotary shutter, and through an image window and an image of a film which passes step by step past the image window for projection by a projector lens onto a cinema screen. In order to obtain a higher image frequency, the rotary shutter is made of light transparent material that is coated so that light passes through only its single light transmission window. Thereby the rotary speed of the rotary shutter can be significantly increased.

4 Claims, 2 Drawing Sheets

CINEMATIC FILM PROJECTOR

The invention concerns a cinematic film projector and more particularly a projector of the type in which a film is moved step by step past an image window, and only when the image is stationary is it projected on to a screen. For this purpose a rotary shutter is provided. In addition, as a rule, an infrared filter is provided to limit the development of heat on the film.

The rotary shutter is synchronized with the film transport speed, so that only when an image is stationary is light released for image projection. The film transport speed is conventionally set at 24 images per second. As a result there is a certain flickering. This can be reduced in that even with a static image, a brief light beam interruption is carried out by a correspondingly designed rotary shutter. This can be achieved by a conventional mechanical rotary shutter, which for example has instead of only one light interruption, two or three light openings, and in this case we speak of a single blade shutter, double blade shutter, triple blade shutter. A single blade shutter which is made of metal rotates at triple speed and has a high inertia moment. Thus there is the danger of asymmetry, and given the necessary high rotational speed leads to problems of lack of balance.

Decisive for the degree of actinity, or in other words the efficiency with which the projector's light is effective for projecting an image on a wall or surface, is the magnitude of the dark sector. This dark sector depends on the switch ratio of the switch drive and corresponds to the timing of the film transporter $K_B$. In addition there is the time span which is needed to cover the light beam before the beginning $T_{LA}$ and after the end $T_{LE}$ of the switch movement.

The time span of the dark sector $T^G$:

(1) $T_G = T_{LA} + T_B + T_{LE}$ single blade shutter (2) $T_G = 2(T_{LA} + T_B + T_{LE})$ double blade shutter (3) $T_G = 3(T_{LA} + T_B + T_{LE})$ triple blade shutter In fact a triple blade shutter eliminates the flicker phenomena, but it reduces the degree of actinity E substantially.

(4) actinity degree E=dark phase/light phase

The cover times $T_A$ and $T_E$ are also taken into consideration in addition to the time $T_B$ which is multiplied by the number of the blades.

This additional effect can be reduced in the case of a three blade shutter by the use of a shutter with a single blade, but the blade is caused to rotate at three times the speed. In this way the light beam is interrupted three times per image, corresponding to a shutter frequency of 72 Hz.

Whereas the time $T_B$ remains the same (the time of the switch drive does not change), the cover times $T_A$ and $T_E$ are reduced, because the angle which is necessary to cover and/or to release the beam of light remains constant, whereas the angular speed of the shutter increases.

For reasons of heat stability, rotary shutters are conventionally produced from metal. For a single blade shutter the rotational speed is shown as:

(5) v=3×24×60=4320 rpm.

These high rpm, in the case of an asymmetric single blade shutter, lead to substantial problems of lack of balance.

The invention is based on the object of designing a cinematic film projector in accordance with the preamble to claim 1 so that in the case of increased image interruption frequency, problems of imbalance can be avoided.

In accordance with the invention, the problem is solved by the features of claim 1. Further embodiments of the invention are placed under protection in the subclaims.

In the subject of the invention, a rotation symmetrical rotary shutter is used, made of a heat-resistant light transparent material, preferably of glass. The rotary shutter has a single light transparent transmission window in the optical beam path, and the rotational speed is correspondingly increased against a three blade conventional mechanical shutter by three times. Thereby, instead of an image frequency of conventionally 24 images per second, the result is an image frequency of 72 images per second.

It should be mentioned that even a doubling of the image frequency by the provision of two transmission windows which are offset by 180°, and thus opposite each other, would already produce a clear improvement, in which an image frequency of 48 images per second would be attainable.

The light transparent material which is used provides the possibility of a coating, for example with infrared inhibiting material, in which a coating is only necessary in the transmission window, and the rest of the disk, for example, can be made light and heat impermeable by a corresponding coating or covering. The light attenuation due to the otherwise conventional additional infrared disk of glass of about 10% is thereby precisely compensated for.

The rotary shutter which is connected with the drive shaft of the motor can be accommodated in a small fixed housing, so that respectively there is a few mm of spacing from the walls. The housing can consist of two metallic half plates, which are opposite each other and are secured to the two ring edges of a small metal ring, preferably adhesively. One of the metallic half plates can be connected via a motor flange with the motor, for example adhesively. The two half plates have passage apertures opposite each other corresponding to the position of the transmission window of the rotary shutter. In centrically arranged recesses, each of the two metallic half plates can be provided with a motor adapter, one end of which is connected with the rotary shutter, while the other end of it is connected with the drive shaft of the motor.

The rotary shutter of glass which rotates between the two fixed metallic half plates passes over, with its transmission window, periodically per rotation the two opposite light passage windows of the half plates. Due to the small spacings from the wall, the air is drawn into the two gaps and it causes a cooling of the rotary shutter by up to 100° C. This makes it possible to use less temperature-resistant materials. Thereby the film, which is arranged before the rotary shutter, is also protected.

One embodiment of the invention is shown in the drawings.

Figure 1:
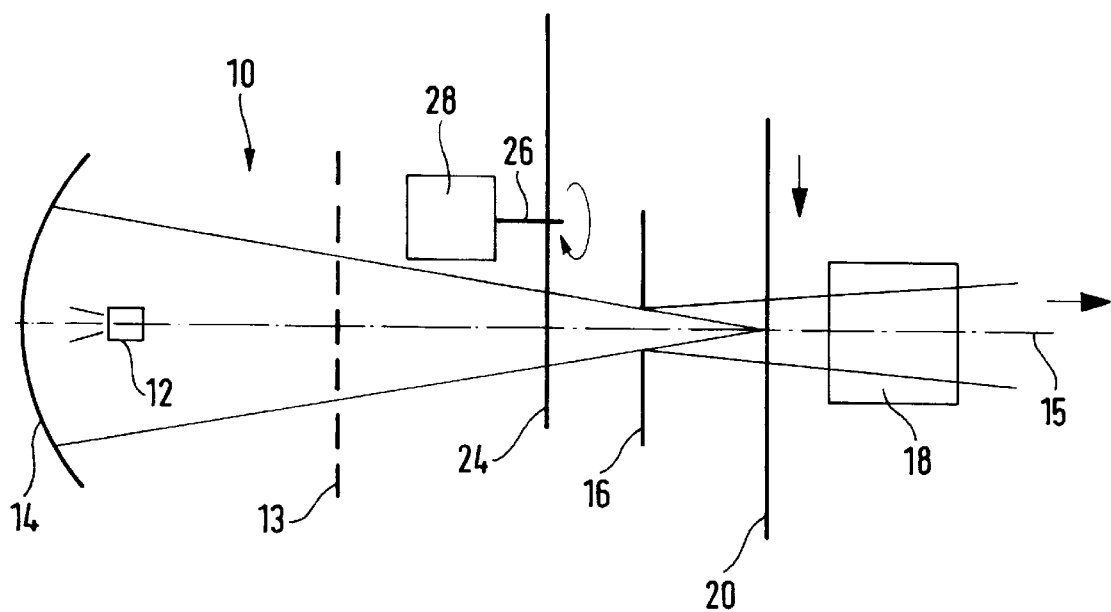
FIG. 1 shows the schematic form of a total illustration of a cinematic film projector from the side.

In accordance with FIG. 1, in a film projector, a light source 12 projects via a hollow mirror 14 light along the light axis or optical axis 15 through the transmission window 25 of the rotary shutter 24, which rotates around a drive shaft 26, through the image window 16 corresponding to the film format, through the film 20 which is moved by a conventional transport device (not shown) in the transverse direction, and over the projection lens 18 to a film screen which is not shown. The drive shaft 26 for the rotary shutter 24 is driven by a motor 28, which can conventionally have a gear. The interrupted lines show an infrared filter 13, which however, in the subject of the invention is not present as a separate component.

Figure 2:
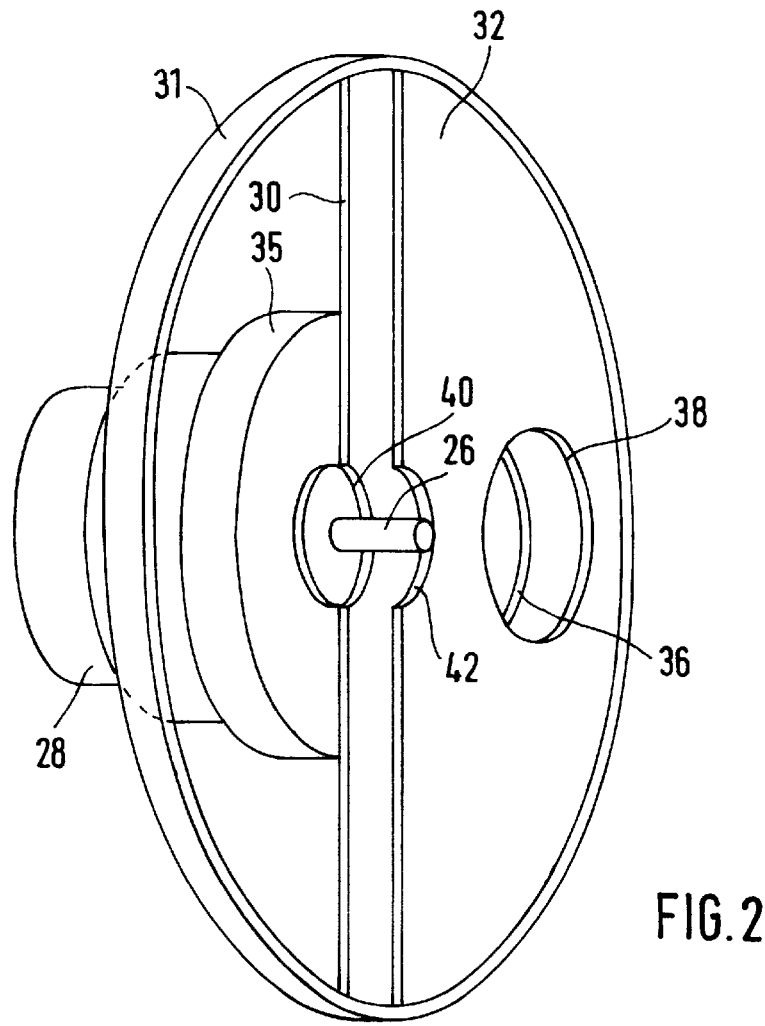
FIG. 2 shows the motor and housing in perpective illustration.

FIG. 2 shows the motor 28 with drive shaft 26 for the rotary shutter (which is not shown) and with a motor housing 35 which at one end is formed as a flange facing one side of the rotary shutter. In front of flange 35 a housing is shown, which consists of a small metal ring 31, on each of the two ring edges of which respectively one of two metallic half plates 30 and 32 is secured, preferably adhesively. One of these half plates, marked as 30, is connected with the motor flange 35, preferably adhesively. The half plates have opposite each other non-centric light passage apertures 36, 38 for registry with the transmission window 25 of the rotary shutter 24 (see FIG. 3), and in addition they each have coaxially of shaft 26 a centric, semi-circular aperture 40, 42 for a motor adapter 34 (see FIG. 3).

Figure 3:
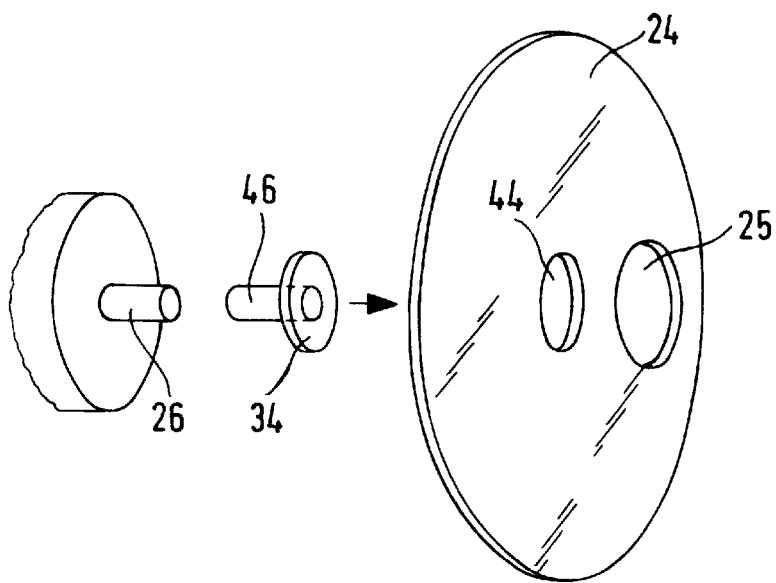
FIG. 3 shows the rotary shutter with motor adapter.

FIG. 3 shows the rotary shutter 24 in the form of a small circular glass plate having therethrough a non-centric, infrared inhibiting, coated light transmission window 25, and the centric aperture 44, on which the motor adapter 34 can be flanged or glued, while its section 46 on the side of the motor can be connected with the drive shaft 26 of motor 28, for example it can be moved over it.

The rotary shutter rotates between the two half plates 30 and 32 at three times the rotational speed compared with conventional rotary shutters. The static image which is projected is interrupted three times during its projection so that a de facto image frequency of 72 images per second results, compared with the conventional projection frequency of 24 images per second. The increased frequency generates a substantially stronger air flow on to the rotating disk-shaped rotary shutter 24, which is light transparent on one section, and as a rule is made of glass. Between the rotary shutter 24 and each of the two opposed metallic half plates 30, 32 there is respectively a small air slit of about 1 to 3 mm, into which the air is drawn during rotation. Thus in practice a ventilator results; this leads to a clear reduction of temperature of more than 100° C. Thereby the use of special light transparent materials with lower temperature resistance is made possible, and in addition a longer service life and greater protection for the film.

SUMMARY OF THE ADVANTAGES

Reduction of the mass intertia moment and thereby lower demands on the drive motor. Glass has a similar specific weight to aluminium, but substantially higher resistance to temperature.

Due to the high rotational speed, dust particles cannot be deposited so easily on the glass surface. Because the heat stress is substantially lower, the burn in of the dirt particles is not possible. This is the case with a static heat protection filter and leads in the long term to an increasing light attenuation.

Because of the rotation symmetrical structure of the glass disk, imbalances are reduced to a minimum so that even at high rotational speeds the balancing of the dynamic mass is not necessary.

Because of the coating of the shutter in the transparent transmission window with a heat reflection layer which is effective in the infrared range, the otherwise conventional heat reflection filter can be dispensed with. The light actinity degree is thereby not worsened as a whole, in that in the passage zone (bright phase), there is glass instead of air.

The shutter in the image window zone has the effect of a ventilator due to the housing around one part of the rotary shutter, the high angular speed and the adhesion force between glass and air. Temperature reductions on the image window of about 100° C. were measured, caused by the effect described above.

The high angular speed reduces the time which is needed to cover the light cone before a transport step and then to open it again. The light actinity degree is thereby increased.

The use of a single blade shutter, which circulates at three times the speed and therefore takes effect in light technology as a three blade shutter, makes possible for the first time a three blade shutter with a higher actinity degree, without shutter drawing.

What is claimed is:

1. In a cinematic film projector having a light source (12, 14), in an infrared filter (13), an image window (16) in front of said source and filter and corresponding to the image format of a film (20), a transport device for effecting the step by step transport of film past the window, thereby to form, image by image, a static film image in front of the image window (16), a projector lens (18) in front of said film, and behind said window a rotary shutter (24), which only allows passage of light in an optical beam path (15) to the static film image, and the improvement characterized in that, (a) said rotary shutter (24) is a symmetrical single blade, disc-shaped shutter rotatable coaxially about its axis, and made of heat-resistant, light transparent glass, and having therethrough a single, non-centric opening, (b) said rotary shutter (24) having thereon a coating operatively forming through said opening in the shutter only a single non-centric light transport transmission window (25) provided in the optical beam path (15), (c) the rotary shutter (24) is provided with an increased and multiplied rotational speed as compared to a three blade conventional blade shutter, whereby the single transmission window (25), with unaltered conventional film transport speed, comes to coincide with each static image formed in front of the image window (16) between the lens (18) and the shutter (24), and (d) the rotary shutter (24) being arranged to rotate in a narrow space in a fixed housing (31, 30, 32), said housing having therein two registering light passage apertures (36, 38) arranged to register with the transmission window (25) of the rotary shutter (24).

2. A cinematic film projector in accordance with claim 1, characterized in that the rotary shutter (24) is thereby simultaneously used as an infrared filter, in that the transmission window (25) is correspondingly coated.

3. A cinematic film projector in accordance with claim 1, including a motor having a drive shaft, and characterized in that the housing (31, 30, 32) has therein concentric recesses (40, 42) for accommodating a motor adapter (34), for connecting the drive shaft (26) of the motor (28) with the rotary shutter (24).

4. A cinematic film projector in accordance with claim 3, characterized in that the housing of the rotary shutter (24) consists of a small metal ring (31) which has an internal diameter larger than the external diameter of the rotary shutter, on which ring two light impermeable half discs (30,32) are secured, of which one (30) is firmly connected with a housing (35) of the motor.

* * * * *